(12) United States Patent
Yoshikawa et al.

(10) Patent No.: US 7,460,166 B2
(45) Date of Patent: Dec. 2, 2008

(54) SWITCHOVER IMAGE TAKING APPARATUS (75) Inventors: Kazumasa Yoshikawa, Tochigi (JP); Isao Tanaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 10/845,041

(22) Filed: May 12, 2004

(65) Prior Publication Data
US 2004/0227842 A1 Nov. 18, 2004

(30) Foreign Application Priority Data
May 13, 2003 (JP) ............... 2003-134509

(51) Int. Cl.
*H04N 5/232* (2006.01)
(52) U.S. Cl. .................... 348/345
(58) Field of Classification Search ......... 348/345–347, 348/375, 357; 396/137
See application file for complete search history.

(56) References Cited

U.S. PATENT DOCUMENTS

| | | | |
|---|---|---|---|
| 4,763,154 A * | 8/1988 | Iguchi et al. ............. | 396/99 |
| 5,633,680 A | 5/1997 | Kaneko et al. | |
| 5,826,117 A | 10/1998 | Kawamura et al. | |
| 6,002,885 A * | 12/1999 | Kaneda ..................... | 396/72 |
| 6,219,098 B1 | 4/2001 | Kawamura et al. | |
| 2003/0011685 A1* | 1/2003 | Oka et al. ................. | 348/211.2 |

FOREIGN PATENT DOCUMENTS

| | | |
|---|---|---|
| EP | 0 762 742 A2 | 3/1997 |
| JP | 04-220629 | 8/1992 |
| JP | 7058988 | 3/1995 |
| JP | 10-020179 | 1/1998 |
| JP | 10-213734 | 8/1998 |

* cited by examiner

*Primary Examiner*—Tuan V Ho
(74) *Attorney, Agent, or Firm*—Morgan & Finnegan, LLP (57) ABSTRACT

An image taking apparatus which includes an optical apparatus provided with a focus detection and focusing control unit for controlling a focus lens by an automatic focus detection and focusing control; a remote operation apparatus provided with a first switchover signal inputting unit for performing a switchover between a control of the focus lens by the automatic focus detection and focusing control and a control of the focus lens by a remote instruction control, and a second switchover signal inputting unit for performing a switchover between manual operations of the focus lens by a speed control and a position control; and a switchover signal superposing unit for superposing an output from the first switchover signal inputting unit and an output from the second switchover signal inputting unit.

11 Claims, 7 Drawing Sheets

PRIOR ART

FIG. 4

PRIOR ART

SWITCHOVER IMAGE TAKING APPARATUS

BACKGROUND OF THE INVENTION

1. Field of the Invention

The present invention relates to an image taking apparatus usable in a television camera, a video camera, a television lens, a video lens, and the like which perform an automatic focus detection and focusing control (hereinafter referred to as an AF control).

2. Related Background Art

In recent years, the AF control is indispensable in image taking apparatuses such as video cameras for consumers. In such a kind of AF control, a prevailing method is an automatic focus detecting method in which a signal in conformity with a sharpness of an object is extracted from a pickup signal, and evaluated to execute a focus detecting operation of an optical system.

An operation example of that AF control method will be described with reference to FIG. 3.

Figure 3:
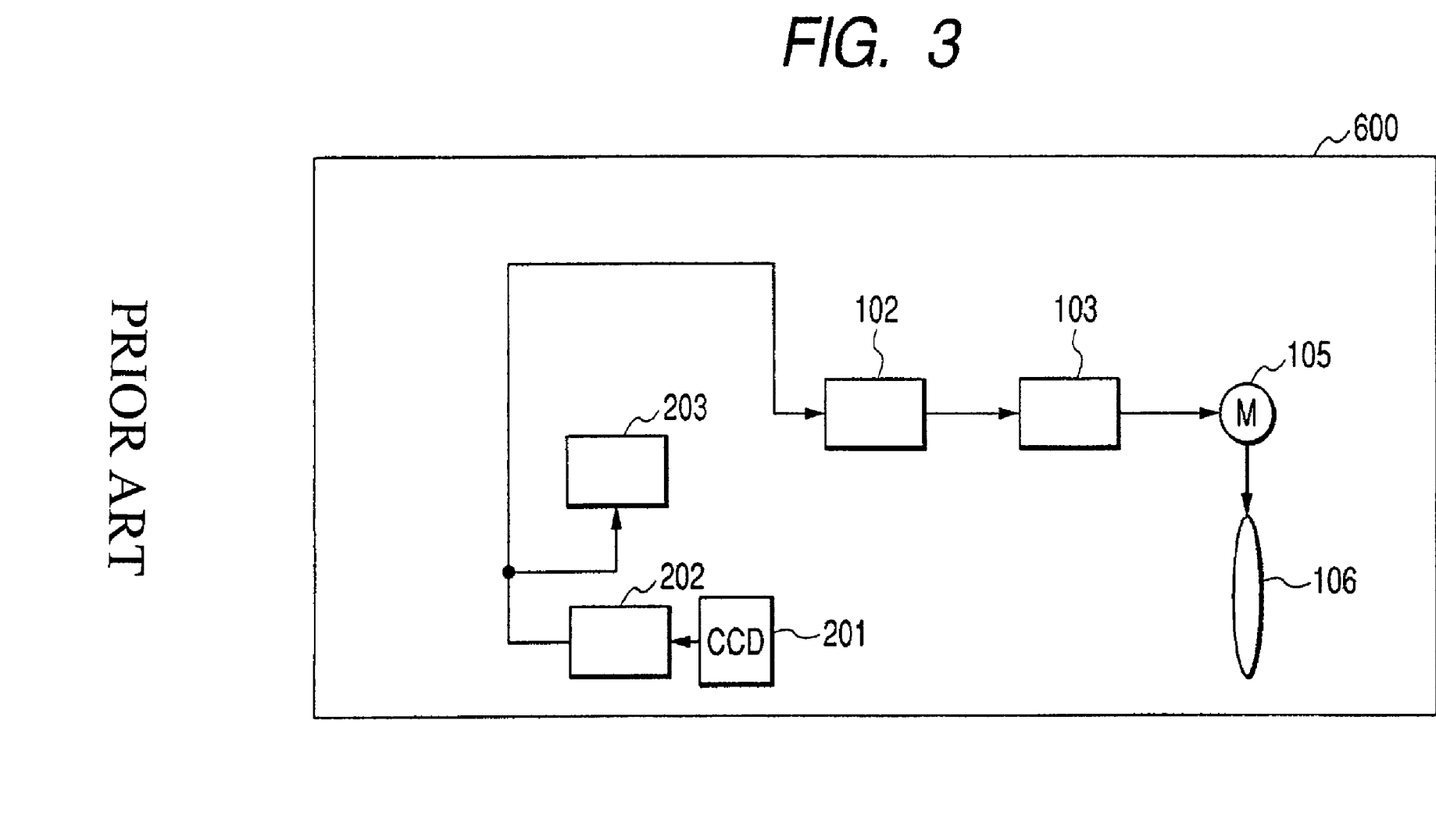
FIG. 3 is a block diagram illustrating a conventional example.

In FIG. 3, reference numeral 600 designates a camera having a lens unit which is incapable of detachable attachment to a camera unit. Reference numeral 102 designates an evaluation value generating unit for extracting a sharpness evaluation value from a video signal output from a processing unit 202 (described later). Reference numeral 103 designates an AF drive controlling unit for generating a motor control signal such that the sharpness evaluation value generated by the evaluation value generating unit 102 can be maximized. Reference numeral 105 designates a motor which is driven under the control of the AF drive controlling unit 103. Reference numeral 106 designates a focus lens movable in its optical-axis direction by the drive of the motor 105. Reference numeral 201 designates a CCD. Reference numeral 202 designates a processing unit for processing an output signal of the CCD 201 and shaping it into a format such as an NTSC signal. Reference numeral 203 designates a recording and reproducing unit for recording a video signal of an output from the processing unit 202 in a record medium, and reproducing a video recorded in the record medium.

In the above structure, a light beam transmitted through the focus lens 106 is imaged on a pickup surface of the CCD 201, and the image is sampled and held, and input into the processing unit 202 after photoelectrically converted by the CCD 201. The processing unit 202 processes the input signal into a video format, such as the NTSC signal, and outputs it into the evaluation value generating unit 102 and the recording and reproducing unit 203. The video signal output to the evaluation value generating unit 102 undergoes a filtering process and the like in the evaluation value generating unit 102, and the sharpness evaluation value relevant to a frequency component of the video is thereby generated by a unit of a vertical synchronization period of the video signal. The thus-generated sharpness evaluation value is output into the AF drive controlling unit 103. The AF drive controlling unit 103 generates the motor control signal for moving the focus lens 106 to a position whereat the sharpness evaluation value becomes maximum, while driving the motor 105 and successively comparing the sharpness evaluation values by a unit of the vertical synchronization period. The AF drive controlling unit 103 thus drives the motor 105 to move the focus lens 106 to its in-focus state. The recording and reproducing unit 203 records the output of the processing unit 202 in the record medium, and reproduces the recorded video image.

A driving example of such an AF operation will be described. Initially, judgment of a driving direction is performed by judging if the in-focus state is on a far-distance side or a short-distance side relative to a current position of the focus lens 106. In this judgment, the focus lens is moved by a small amount, and the judgment is performed based on a change of the sharpness evaluation value at the moved position. After that, the focus lens 106 is moved at a certain rate according to the result of the driving direction judgment to detect a peak value of the sharpness evaluation value. This is a so-called hill-climbing method. The moving direction of the focus lens 106 is reversed after the peak value is detected, and the focus lens 106 is moved by a unit of a small amount, and guided such that the sharpness evaluation value can be maximized. This is called a peak judgment. After the peak judgment, the sharpness evaluation value continues to be read, and the read value is compared with a value immediately after the peak judgment. Upon detection of variation of the value, the AF operation is re-started.

Such a video AF operation in a camera system adopting an interchangeable lens structure is disclosed in EP-762742-A2.

Further, there exist a group of products (hereinafter referred to as a remote system) for remote operation uses to be used for monitoring, bridal image taking and the like, such as television cameras, video cameras, television lenses, and video lenses. In such a remote system, no AF control is installed, and its structure is constructed such that an operator can operate a switch, a volume switch and the like installed in a remote control unit capable of remote operation, and zooming, iris stop and focusing can be remotely controlled.

In the remote system, an electrical interface is established between the remote control unit and the camera, and twelve (12) pins are assigned to instruction signals of zooming, iris stop and focusing, control mode signals (switchover between a speed control and a position control), electrical power source, ground and so forth, respectively. Thus, there are no vacant pins in the system.

An operation example of the remote system will be described with reference to FIG. 4. Portions designated by reference numerals 600, 201 to 203, 105 and 106 in FIG. 4 are those discussed above with reference to FIG. 3, and accordingly descriptions thereof are omitted.

Figure 4:
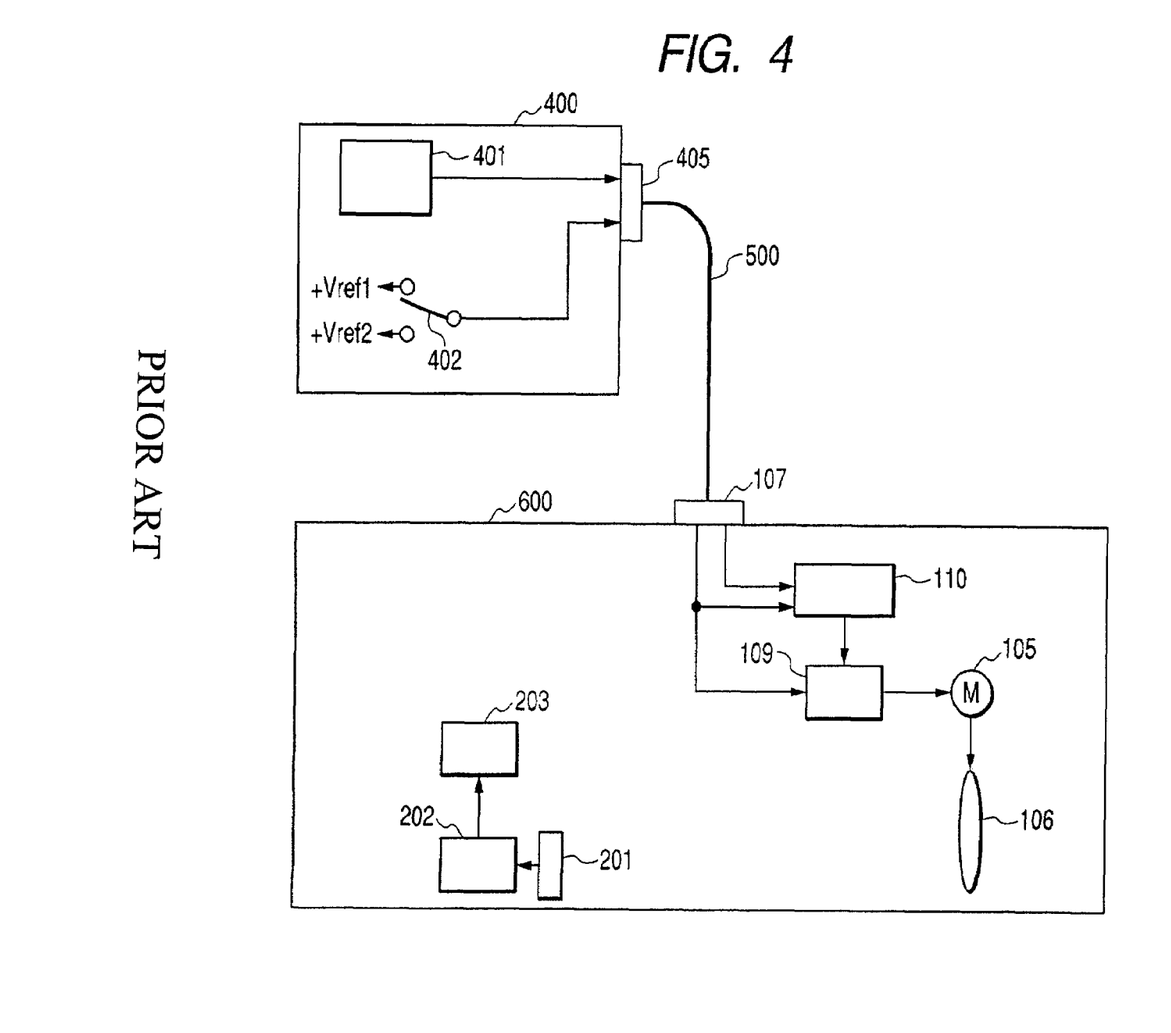
FIG. 4 is a block diagram illustrating a conventional example.

In FIG. 4, reference numeral 400 designates a remote control unit for supplying to the camera 600 instruction signals for controlling a zoom lens portion (not shown), an iris stop portion (not shown), and the focus lens 106 provided in the camera 600, and a switchover signal for performing the switchover between controls of the focus lens 106 by the speed control and the position control. Reference numeral 500 designates a remote control cable connecting the camera 600 and the remote control unit 400. Reference numeral 107 designates a remote control input terminal for inputting the instruction signal and the switchover signal from the remote control unit 400 into the camera 600 therethrough. Reference numeral 109 designates a manual focus (hereinafter referred to as MF) drive controlling unit for generating a motor control signal for driving the motor 105 from an MF instruction signal from the remote control unit 400. Reference numeral 110 designates an S/P switchover signal judging unit for outputting to the MF drive controlling unit 109 an S/P switchover instruction signal for instructing whether the control of the focus lens 106 should be executed by the speed control or the position control based on at S/P switchover signal output from an S/P switchover signal inputting unit 402.

In the remote control unit 400, there are arranged an MF instruction signal generating unit 401 for generating the MF instruction signal, which is comprised of the switch, the volume switch and so forth, the S/P switchover signal inputting unit 402 for performing the switchover of the control of the focus lens 106 between the speed control and the position control, and a remote control output terminal 405 for outputting to the camera 600 the instruction signal and the switchover signal from the remote control unit 400.

In the above-discussed structure, in accordance with an operation of the MF instruction signal generating unit 401, the MF instruction signal proportional to this operation is output from the MF instruction signal generating unit 401, and is input into the MF drive controlling unit 109 through the remote control output terminal 405, the remote control cable 500, and the remote control input terminal 107. Further, the S/P switchover signal for performing the switchover of the control of the focus lens 106 between the speed control and the position control is output from the S/P switchover signal inputting unit 402, and is input into the S/P switchover signal judging unit 110 through the remote control terminal 405, the remote control cable 500, and the remote control input terminal 107. The S/P switchover signal judging unit 110 judges by which of the speed control and the position control the control of the focus lens 106 should be executed, and its judgment result is output to the MF drive controlling unit 109 as the S/P switchover instruction signal. In the MF drive controlling unit 109, where the S/P switchover instruction signal is a signal for performing the control of the focus lens 106 by the speed control, the MF instruction signal is treated as a speed control instruction signal, and the motor control signal for driving the motor 105 at such a speed as instructed by the MF instruction signal is generated. The motor 105 is accordingly driven to move the focus lens 106. On the other hand, where the S/P switchover instruction signal is a signal for performing the control of the focus lens 106 by the position control, the MF instruction signal is treated as a position control instruction signal, and the motor control signal for driving the motor 105 to such a position as instructed by the MF instruction signal is generated. The motor 105 is accordingly driven to move the focus lens 106.

In the above-discussed conventional example, however, where the AF control is installed in the remote system, there are no vacant pins at the electrical interface between the remote control unit and the camera. It is therefore impossible to assign to the electrical interface the switchover signal for performing the switchover of the drive of the focus lens between the AF control and the MF control from the remote control unit, and provide in the remote control unit the switchover unit for performing the switchover of the drive of the focus lens between the AF control and the MF control.

SUMMARY OF THE INVENTION

In view of the above disadvantage, it is an object of the present invention to provide a structure which, where an AF control is installed in a remote system, is capable of arrangement in a remote operating apparatus a switchover unit for performing a switchover between drives of a focus lens under an AF control and an MF control, and capable of performing the MF control at the time of the AF control, thereby achieving more advantageous use of the remote system, even in the event that there are no vacant pins at an electrical interface between the remote operating apparatus and an optical apparatus.

In order to achieve the above object, according to one aspect of the present invention, there is provided an image taking apparatus which includes an optical apparatus provided with a focus detection and focusing controlling unit for controlling a focus lens by an automatic focus detection and focusing control, and a remote operating apparatus provided with a first switchover signal inputting unit for performing a switchover between control of the focus lens by the automatic focus detection and focusing control and control of the focus lens by a remote instruction control, and a second switchover signal inputting unit for performing a switchover between manual operations of the focus lens by a speed control and a position control, and which further includes a switchover signal superposing unit for superposing an output from the first switchover signal inputting unit and an output from the second switchover signal inputting unit.

Where the AF control is installed in the remote system, the apparatus of the present invention is capable of arrangement in the remote operating unit of the switchover unit for performing the switchover between drives of the focus lens by the AF control and the MF control, and capable of performing the MF control at the time of the AF control, thereby achieving more advantageous use of the remote system, even in the event that there are no vacant pins at the electrical interface between the remote operating unit and the optical apparatus.

These and further aspects and features of the invention will become apparent from the following detailed description of preferred embodiments thereof in conjunction with the accompanying drawings.

DESCRIPTION OF THE PREFERRED EMBODIMENTS

First Embodiment

Figure 1:
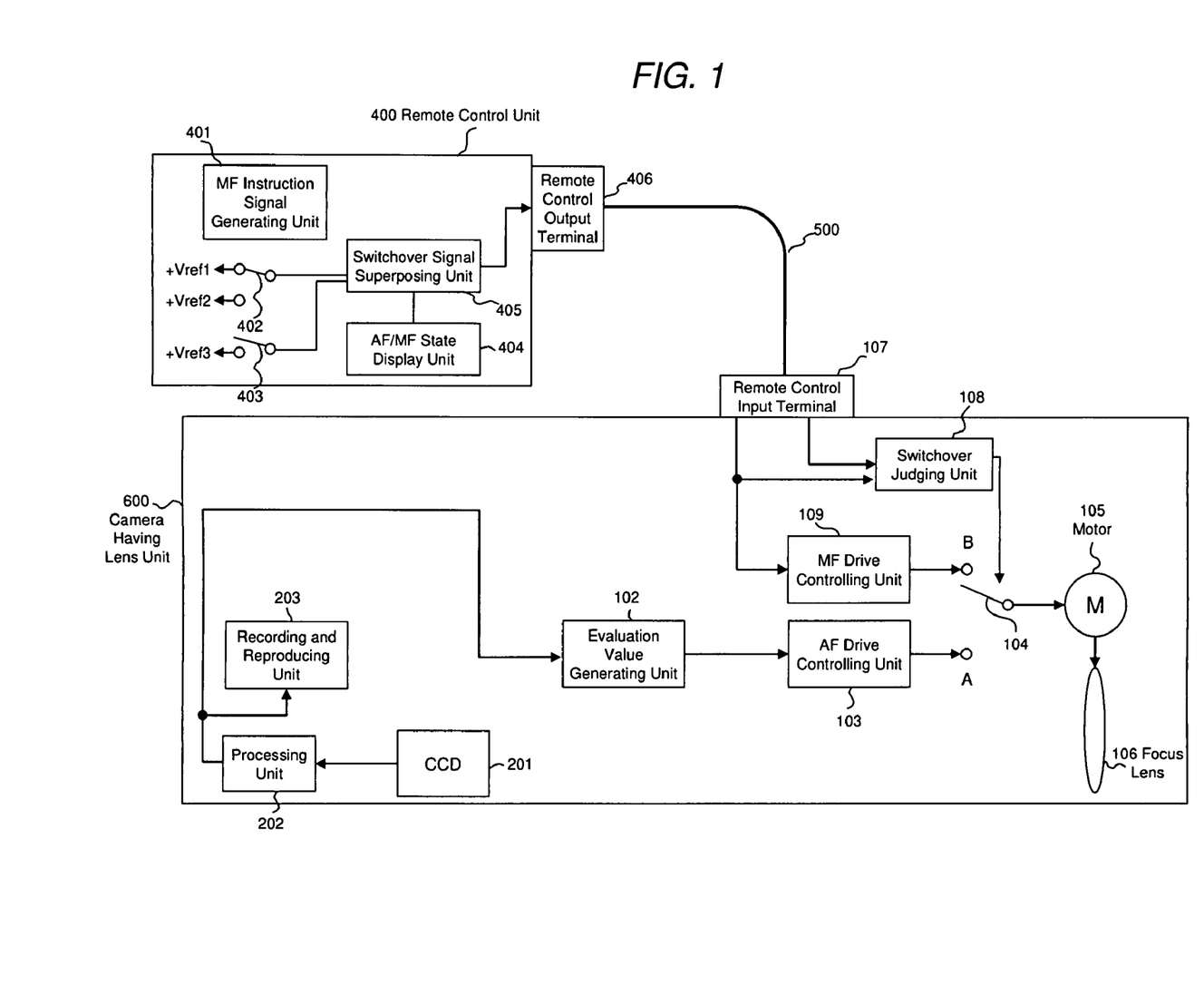
FIG. 1 is a block diagram illustrating a first embodiment according to the present invention.

A first embodiment of the present invention will be described hereinafter with reference to FIG. 1. FIG. 1 shows the structure of an image taking apparatus of the first embodiment.

In FIG. 1, reference numeral 600 designates a camera having a lens unit, which is incapable of detachable attachment to a camera unit. Reference numeral 400 designates a remote control unit for supplying to the camera 600 instruction signals for controlling a zoom lens portion (not shown), an iris stop portion (not shown), and a focus lens 106 provided in the camera 600 in a remote manner, and a switchover signal for performing a switchover between controls of the, zoom lens portion (not shown), the iris stop portion (not shown), and the focus lens 106 by a speed control and a position control. Reference numeral 500 designates a remote control cable connecting the camera 600 and the remote control unit 400.

In the camera 600, reference numeral 102 designates an evaluation value generating unit for extracting a sharpness evaluation value from a video signal output from a processing unit 202 (described later). Reference numeral 103 designates an AF drive controlling unit for generating a motor control signal such that the sharpness evaluation value generated by the evaluation value generating unit 102 can be maximized. Reference numeral 104 designates an AF/MF switchover unit which is controlled by a switchover judging unit 108 (described later), and performs a switchover of a control signal for driving the focus lens 106 between a control signal from the AF drive controlling unit 103 and a control signal from an MF drive controlling unit 109 (described later). Reference numeral 105 designates a motor which is driven under the control of the AF drive controlling unit 103 or the MF drive controlling unit 109. Reference numeral 106 designates a focus lens movable in its optical-axis direction by the drive of the motor 105.

Reference numeral 107 designates a remote control input terminal for inputting an MF instruction signal and a switchover signal from the remote control unit 400 into the camera 600 therethrough. Reference numeral 108 designates a switchover judging unit which judges if the switchover signal from an AF/MF switchover signal inputting unit 403 (described later) indicates the AF control or the MF control, judges if the control of the focus lens 106 should be executed by a speed control or a position control in a case of the MF control, outputs to the MF drive controlling unit 109 (described later) an S/P switchover instruction signal for instructing the MF drive controlling unit 109 to perform the control of the focus lens 106 by the speed control or the position control, judges if the control of the focus lens 106 should be performed by the AF control or the MF control to accordingly perform the switchover of the AF/MF switchover unit 104, stores a state of an S/P switchover signal inputting unit 402 prior to the switchover of the AF/MF switchover signal inputting unit 403 to the AF control, and judges if an MF instruction signal generating unit 401 is operated or not.

Reference numeral 109 designates an MF drive controlling unit for generating, from an MF instruction signal from the remote control unit 400, a motor control signal for driving the motor 105 such that the control of the focus lens 106 can be executed by the speed control or the position control in accordance with an S/P switchover instruction signal from the switchover signal judging unit 108. Reference numeral 201 designates a CCD. Reference numeral 202 designates a processing unit for processing an output signal of the CCD 201 and shaping it into a format such as the NTSC signal. Reference numeral 203 designates a recording and reproducing unit for recording a video signal of an output from the processing unit 202 in a record medium, and reproducing a video recorded in the record medium.

In the remote control unit 400, reference numeral 401 designates an MF instruction signal generating unit for generating the MF instruction signal, which is comprised of a switch, a volume switch and so forth. Reference numeral 402 designates an S/P switchover signal inputting unit for performing a switchover of the control of the focus lens 106 between the speed control and the position control. Reference numeral 403 designates an AF/MF switchover signal inputting unit for performing a switchover of the drive of the focus lens 106 between the AF control and the MF control. Reference numeral 404 designates an AF/MF state display unit for displaying a condition of the AF control or the MF control under which the focus lens 106 is controlled. Reference numeral 405 designates a switchover signal superposing unit for superposing an output signal from the S/P switchover signal inputting unit 402 and an output signal from the AF/MF switchover signal inputting unit 403. Reference numeral 406 designates a remote control output terminal for outputting to the camera 600 the MF instruction signal and the switchover signal from the remote control unit 400.

In the thus-constructed structure, description will be made to an operation in the event that the AF/MF switchover signal inputting unit 403 is set such that the control of the focus lens 106 can be executed by the AF control, and the MF instruction signal generating unit 401 is not operated.

A light beam transmitted through the focus lens 106 is imaged on a pickup surface of the CCD 201, and the image is sampled and held, and input into the processing unit 202 after photoelectrically converted by the CCD 201. The processing unit 202 processes the input signal into a video format, such as the NTSC signal, and outputs it into the evaluation value generating unit 102 and the recording and reproducing unit 203. The video signal output to the evaluation value generating unit 102 undergoes a filtering process and the like in the evaluation value generating unit 102, and the sharpness evaluation value relevant to a frequency component of the video is thereby generated by a unit of a vertical synchronization period of the video signal. The thus-generated sharpness evaluation value is output into the AF drive controlling unit 103.

On the other hand, since the AF/MF switchover signal inputting unit 403 in the remote control unit 400 is set such that the focus lens 106 can be driven by the AF control, the AF/MF state display unit 404 displays the AF control, and a switchover signal Vref3 different from Vref1 and Vref2 is input into the switchover signal superposing unit 405. The switchover signal superposing unit 405 outputs the switchover signal Vref3 irrespective of the state of the S/P switchover signal inputting unit 402, and the switchover signal Vref3 is input into the switchover judging unit 108 through the remote control output terminal 406, the remote control cable 500 and the remote control input terminal 107. Since the switchover signal is Vref3, the AF/MF switchover judging unit 108 performs the switchover of the AF/MF switchover unit 104 to a side A such that the control of the focus lens 106 can be executed by the AF control. Accordingly, the motor 105 is driven by the motor control signal from the AF drive controlling unit 103, and the focus lens 106 is hence moved.

Further, description will be made to an operation in the event that the MF instruction signal generating unit 401 is operated under the above-discussed condition.

The switchover signal judging unit 108 identifies the fact that the MF instruction signal generating unit 401 is operated under the condition under which the control of the focus lens 106 is executed by the AF control, and the judging unit 108 performs the switchover of the AF/MF switchover unit 104 to a side B. At the same time, the switchover signal judging unit 108 beforehand stores the switchover signal input from the S/P switchover signal inputting unit 402 prior to the switchover of the AF/MF switchover signal inputting unit 403 to the AF control, i.e., the signal for performing the control of the focus lens 106 by the speed control where the switchover signal is Vref1 different from Vref2 and Vref3, and the signal for performing the control of the focus lens 106 by the position control where the switchover signal is Vref2 different from Vref1 and Vref3, and outputs to the MF drive controlling unit 109 the S/P switchover instruction signal in accordance with the thus-stored information.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106. On the other hand, in the event that the S/P switchover instruction signal is the signal for performing the control of the focus lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

Finally, description will be made to an operation in the event that the AF/MF switchover signal inputting unit 403 is set such that the focus lens 106 can be driven by the MF control.

In response to an operation of the MF instruction signal generating unit 401 comprised of the switch, the volume switch and the like in the remote control unit 400, the MF instruction signal generating unit 401 outputs the MF instruction signal proportional to this operation, and the output signal is input into the MF drive controlling unit 109 through the remote control output terminal 406, the remote control cable 500, and the remote control input terminal 107.

On the other hand, the switchover signal for performing the switchover of the control of the focus lens 106 between the speed control and the position control is output from the S/P switchover signal inputting unit 402 to the switchover signal superposing unit 405. Since the AF/MF switchover signal inputting unit 403 is in an OFF state, the switchover signal superposing unit 405 outputs the output signal Vref1 or Vref2 from the S/P switchover signal inputting unit 402 as the switchover signal, and the output signal is input into the switchover signal judging unit 108 through the remote control output terminal 406, the remote control cable 500, and the remote control input terminal 107. At this moment, the AF/MF state display unit 404 displays the MF control.

In the event that the input switchover signal is Vref1 different from Vref2 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the speed control, and outputs to the MF drive controlling unit 109 the S/P switchover instruction signal for performing the control of the focus lens 106 by the speed control.

In the event that the input switchover signal is Vref2 different from Vref1 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the position control, and outputs to the MF drive controlling unit 109 the S/P switchover instruction signal for performing the control of the focus lens 106 by the position control.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106. In contrast thereto, in the event that the S/P switchover instruction signal is the signal for performing the control of the focus lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

In this embodiment, display of the AF/MF state display unit 404 is conducted by displaying the state of the AF/MF switchover signal inputting unit 403, but it is possible to display a condition (the AF control or the MF control) under which the control of the focus lens 106 is performed.

Further, it is possible to adopt a construction in which the MF instruction signal is taken into the switchover signal superposing unit 405, and under the condition under which the AF/MF switchover signal inputting unit 403 is set such that the control of the focus lens 106 can be performed by the AF control, the switchover signal superposing unit 405 judges if the MF instruction signal generating unit 401 is operated or not.

According to the above-discussed construction, where the AF control is installed in the remote system, the construction is capable of arrangement in the remote operating unit of the switchover unit for performing the switchover between the drives of the focus lens under the AF control and the MF control, and capable of performing the MF control at the time of the AF control, thereby achieving more advantageous use of the remote system, even in the event that there are no vacant pins at the electrical interface between the remote operating unit and the optical apparatus.

Second Embodiment

Figure 2:
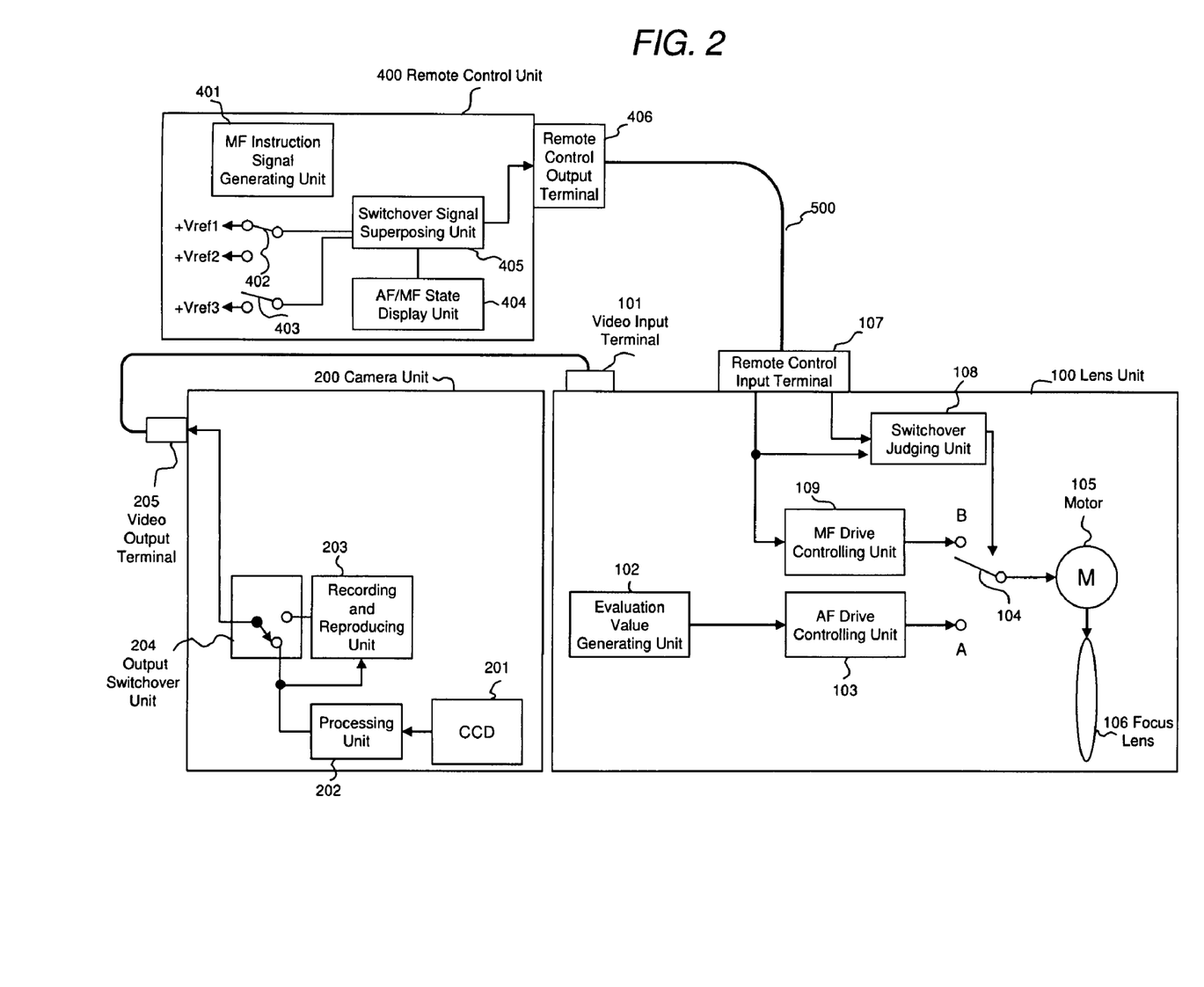
FIG. 2 is a block diagram illustrating a second embodiment according to the present invention.

In the first embodiment, description is made to an example of the camera including the lens unit 100 incapable of detachable attachment to the camera unit. In contrast thereto, a second embodiment of the present invention is directed to an optical apparatus or an image taking apparatus which includes an interchangeable lens unit capable of detachable attachment to a camera unit. The second embodiment will be described hereinafter with reference to FIG. 2. FIG. 2 shows the structure of an image taking apparatus of the second embodiment.

In FIG. 2, reference numerals 102 to 109, 201 to 203, 400 to 406 and 500 designate the same corresponding elements as those illustrated in FIG. 1. Accordingly, descriptions thereof are omitted.

Reference numeral 100 designates a lens unit of an interchangeable lens type, reference numeral 200 designates a camera unit, and reference numeral 300 designates a coaxial cable for video.

In the lens 100, reference numeral 101 designates a video input terminal for receiving a video signal through the video coaxial cable 300.

In the camera 200, reference numeral 204 designates an output switchover unit for selecting one of outputs of video signals from the processing unit 202 and the recording and reproducing unit 203, and outputting the selected one. Reference numeral 205 designates a video output terminal for outputting the output of the video signal from the output switchover unit 204.

In the thus-constructed structure, description will be made to an operation in the event that the AF/MF switchover signal inputting unit 403 is set such that the control of the focus lens 106 can be executed by the AF control, and the MF instruction signal generating unit 401 is not operated.

A light beam transmitted through the focus lens 106 is imaged on a pickup surface of the CCD 201, and the image is sampled and held, and input into the processing unit 202 after photoelectrically converted by the CCD 201. The processing unit 202 processes the input signal into a video format, such as the NTSC signal, and outputs it into the output switchover unit 204 and the recording and reproducing unit 203. At the time of recording, the output switchover unit 204 outputs the output of the processing unit 202 to the video output terminal 205, and the recording and reproducing unit 203 records the output of the processing unit 202 in a record medium. At the time of reproduction, the recording and reproducing unit 203 reproduces a video signal recorded in the record medium, and when the video signal is stably reproduced, the output switchover unit 204 outputs the video signal of the recording and reproducing unit 203 to the video output terminal 205.

Into the video input terminal 101 of the lens 100, the video signal from the video output terminal 205 of the camera 200 is input through the video coaxial cable 300. The video signal input into the video input terminal 101 undergoes a filtering process and the like in the evaluation value generating unit 102, and the sharpness evaluation value relevant to a frequency component of the video is thereby generated by a unit of a vertical synchronization period of the video signal. The thus-generated sharpness evaluation value is output into the AF drive controlling unit 103.

On the other hand, since the AF/MF switchover signal inputting unit 403 in the remote control unit 400 is set such that the focus lens 106 can be driven by the AF control, the AF/MF state display unit 404 displays the AF control, and a switchover signal Vref3 different from Vref1 and Vref2 is input into the switchover signal superposing unit 405. The switchover signal superposing unit 405 outputs the switchover signal Vref3 irrespective of the state of the S/P switchover signal inputting unit 402, and the switchover signal Vref3 is input into the switchover judging unit 108 through the remote control output terminal 406, the remote control cable 500 and the remote control input terminal 107. Since the switchover signal is Vref3, the AF/MF switchover judging unit 108 performs the switchover of the AF/MF switchover unit 104 to a side A such that the control of the focus lens 106 can be executed by the AF control. Accordingly, the motor 105 is driven by the motor control signal from the AF drive controlling unit 103, and the focus lens 106 is hence moved.

Further, description will be made to an operation in the event that the MF instruction signal generating unit 401 is operated under the above-discussed condition.

The switchover signal judging unit 108 identifies the fact that the MF instruction signal generating unit 401 is operated under the condition under which the control of the focus lens 106 is executed by the AF control, and the judging unit 108 performs the switchover of the AF/MF switchover unit 104 to a side B. At the same time, the switchover signal judging unit 108 beforehand stores the switchover signal input from the S/P switchover signal inputting unit 402 prior to the switchover of the AF/MF switchover signal inputting unit 403 to the AF control, i.e., the signal for performing the control of the focus lens 106 by the speed control where the switchover signal is Vref1 different from Vref2 and Vref3, and the signal for performing the control of the focus lens 106 by the position control where the switchover signal is Vref2 different from Vref1 and Vref3, and outputs to the MF drive controlling unit 109 the S/P switchover instruction signal in accordance with the thus-stored information.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106. On the other hand, in the event that the S/P switchover instruction signal is the signal for performing the control of the focus lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

Finally, description will be will be made to an operation in the event that the AF/MF switchover signal inputting unit 403 is set such that the focus lens 106 can be driven by the MF control.

In response to an operation of the MF instruction signal generating unit 401 comprised of the switch, the volume switch and the like in the remote control unit 400, the MF instruction signal generating unit 401 outputs the MF instruction signal proportional to this operation, and the output signal is input into the MF drive controlling unit 109 through the remote control output terminal 406, the remote control cable 500, and the remote control input terminal 107.

On the other hand, the switchover signal for performing the switchover of the control of the focus lens 106 between the speed control and the position control is output from the S/P switchover signal inputting unit 402 to the switchover signal superposing unit 405. Since the AF/MF switchover signal inputting unit 403 is in an OFF state, the switchover signal superposing unit 405 outputs the output signal Vref1 or Vref2 from the S/P switchover signal inputting unit 402 as the switchover signal, and the output signal is input into the switchover signal judging unit 108 through the remote control output terminal 406, the remote control cable 500, and the remote control input terminal 107. At this moment, the AF/MF state display unit 404 displays the MF control.

In the event that the input switchover signal is Vref1 different from Vref2 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the speed control, and outputs to the MF drive controlling unit 109 the S/P switchover instruction signal for performing the control of the focus lens 106 by the speed control.

In the event that the input switchover signal is Vref2 different from Vref1 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the position control, and outputs to the MF drive controlling unit 109 the S/P switchover instruction signal for performing the control of the focus lens 106 by the position control.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106. In contrast thereto, in the event that the S/P switchover instruction signal is the signal for performing the control of the focus, lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

In the second embodiment, display of the AF/MF state display unit 404 is conducted by displaying the state of the AF/MF switchover signal inputting unit 403, but it is possible to display a condition (the AF control or the MF control) under which the control of the focus lens 106 is performed.

Further, it is possible to adopt a construction in which the MF instruction signal is taken into the switchover signal superposing unit 405, and under the condition under which the AF/MF switchover signal inputting unit 403 is set such that the control of the focus lens 106 can be performed by the AF control, the switchover signal superposing unit 405 judges if the MF instruction signal generating unit 401 is operated or not.

According to the above-discussed construction, where the AF control is installed in the remote system, the construction is capable of arrangement in the remote operating unit of the switchover unit for performing the switchover between the drives of the focus lens under the AF control and the MF control, and capable of performing the MF control at the time of the AF control, thereby achieving more advantageous use of the remote system, even in the event that there are no vacant pins at the electrical interface between the remote operating unit and the optical apparatus.

Third Embodiment

Figure 5:
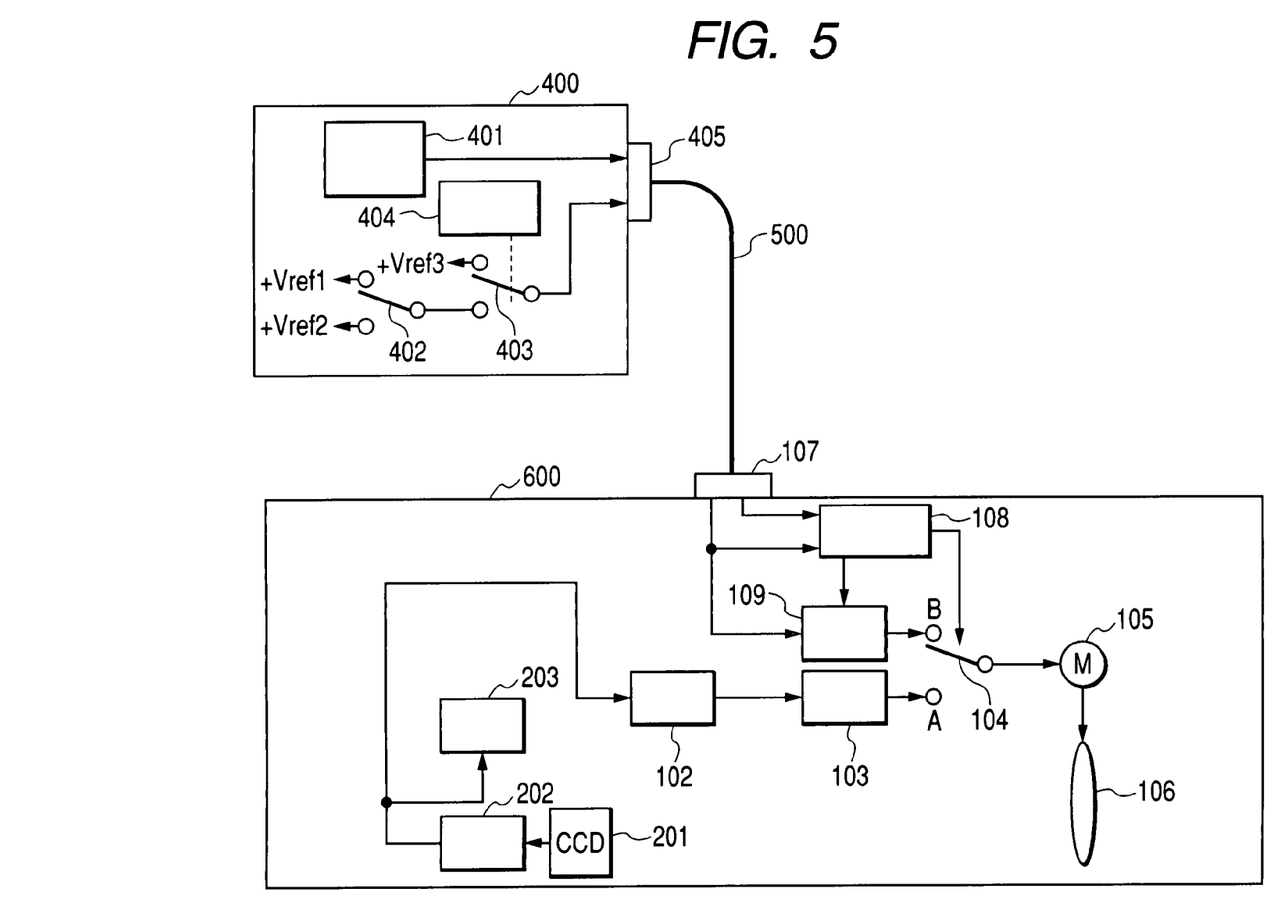
FIG. 5 is a block diagram illustrating a third embodiment according to the present invention.

A third embodiment of the present invention will be described hereinafter with reference to FIG. 5. FIG. 5 shows the structure of an image taking apparatus of the third embodiment.

In FIG. 5, reference numeral 600 designates a camera having a lens unit which is incapable of detachable attachment to a camera unit. Reference numeral 400 designates a remote control unit for supplying to the camera 600 instruction signals for controlling a zoom lens portion (not shown), an iris stop portion (not shown), and a focus lens 106 provided in the camera 600 in a remote manner, and a switchover signal for performing a switchover between controls of the zoom lens portion (not shown), the iris stop portion (not shown), and the focus lens 106 by a speed control and a position control. Reference numeral 500 designates a remote control cable connecting the camera 600 and the remote control unit 400.

In the camera 600, reference numeral 102 designates an evaluation value generating unit for extracting a sharpness evaluation value from a video signal output from a processing unit 202 (described later). Reference numeral 103 designates an AF drive controlling unit for generating a motor control signal such that the sharpness evaluation value generated by the evaluation value generating unit 102 can be maximized. Reference numeral 104 designates an AF/MF switchover unit which is controlled by a switchover judging unit (described later), and performs a switchover of a control signal for driving the focus lens between a control signal from the AF drive controlling unit 103 and a control signal from an MF drive controlling unit 109. Reference numeral 105 designates a motor which is driven under the control of the AF drive controlling unit 103 or the MF drive controlling unit 109. Reference numeral 106 designates a focus lens movable in its optical-axis direction by the drive of the motor 105.

Reference numeral 107 designates a remote control input terminal for inputting an MF instruction signal and a switchover signal from the remote control unit 400 into the camera 600 therethrough. Reference numeral 108 designates a switchover judging unit which judges if a switchover signal from an AF/MF switchover signal inputting unit 403 (described later) indicates an AF control or an MF control, judges if the control of the focus lens 106 should be executed by a speed control or a position control in a case of the MF control, outputs to an MF drive controlling unit 109 (described later) an S/P switchover instruction signal for instructing the MF drive controlling unit 109 to perform the control of the focus lens 106 by the speed control or the position control, judges if the control of the focus lens 106 should be performed by the AF control or the MF control to accordingly control the switchover of the AF/MF switchover unit, stores a state of the S/P switchover signal inputting unit 402 prior to the switchover of the AF/MF switchover signal inputting unit 403 to the AF control, and judges if the MF instruction signal generating unit 401 is operated or not.

Reference numeral 109 designates an MF drive controlling unit for generating, from the MF instruction signal from the remote control unit 400, a motor control signal for driving the motor 105 such that the control of the focus lens 106 can be executed by the speed control or the position control in accordance with the S/P switchover instruction signal from the switchover signal judging unit 108. Reference numeral 201 designates a CCD. Reference numeral 202 designates a processing unit for processing an output signal of the CCD 201 and shaping it into a format such as the NTSC signal. Reference numeral 203 designates a recording and reproducing unit for recording a video signal of an output from the processing unit 202 in a record medium, and reproducing a video recorded in the record medium.

In the remote control unit 400, reference numeral 401 designates an MF instruction signal generating unit for generating the MF instruction signal, which is composed of a switch, a volume switch and so forth. Reference numeral 402 designates an S/P switchover signal inputting unit for performing a switchover of the control of the focus lens 106 between the speed control and the position control. Reference numeral 403 designates an AF/MF switchover signal inputting unit for performing a switchover of the drive of the focus lens between the AF control and the MF control in a momentary operation manner. Reference numeral 404 designates an AF/MF state display unit for displaying a condition of the AF control or the MF control under which the focus lens 106 is controlled. Reference numeral 405 designates a remote control output terminal for outputting to the camera 600 the MF instruction signal and the switchover signal from the remote control unit 400.

In the thus-constructed structure, description will be described to states of the S/P switchover signal and the AF control operation of a switchover signal output from the remote control unit 400, with reference to FIG. 6.

Figure 6:
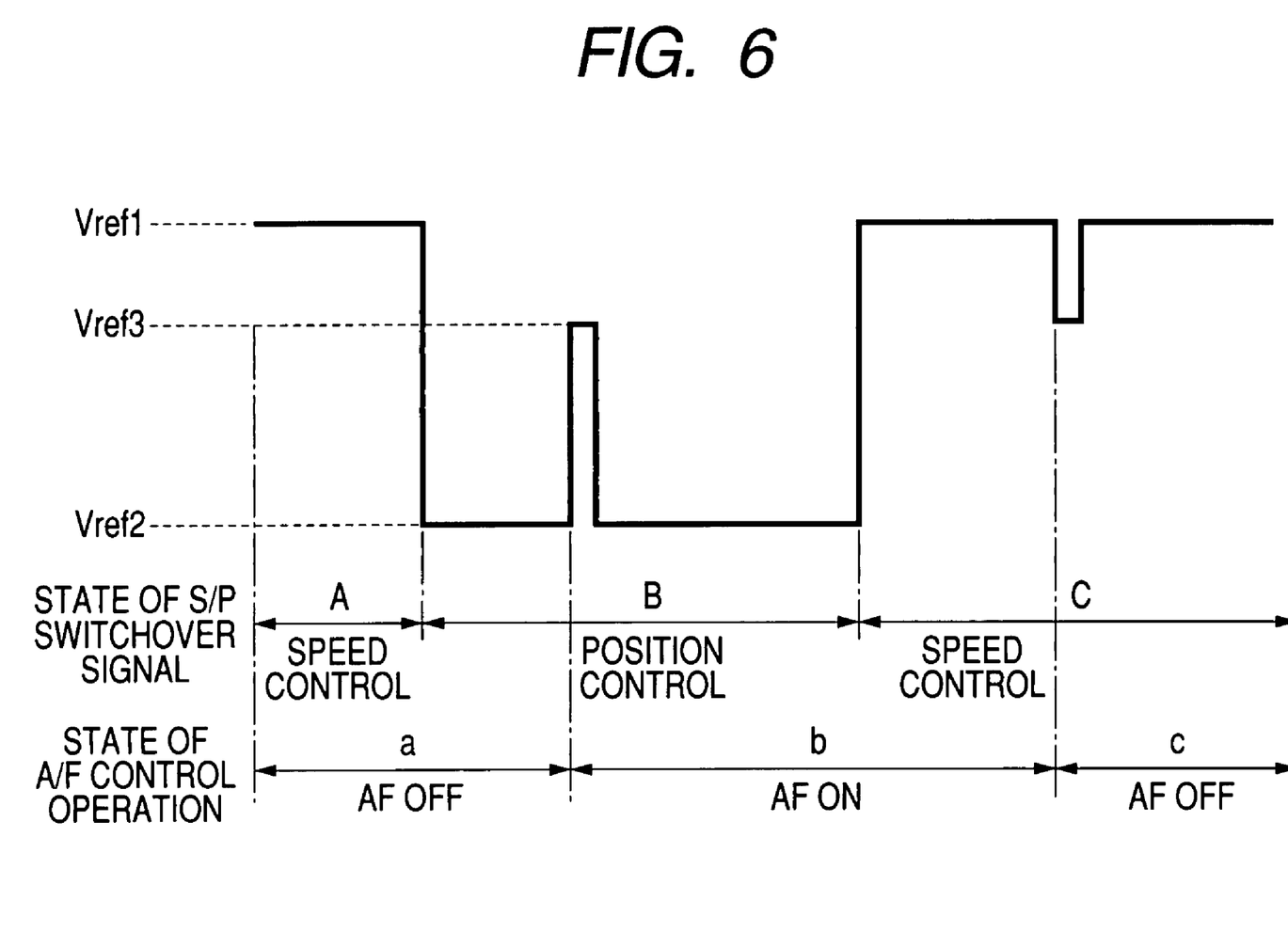
FIG. 6 is a view illustrating a switchover signal from a remote control unit.

In FIG. 6, a solid line indicates the switchover signal output from the remote control unit 400, a dotted line indicates a voltage level of the switchover signal, and the state of the S/P switchover signal of the switchover signal and the state of the AF control operation of the switchover signal are represented.

As the output signal from the S/P switchover inputting unit 402, Vref1 different from Verf2 and Vref3, or Vref2 different from Verf1 and Vref3 is output. Here, Vref1 is a signal for showing that the control of the focus lens 106 should be executed by the speed control, and Vref2 is a signal for showing that the control of the focus lens 106 should be executed by the position control. Further, each time the AF/MF switchover signal inputting unit 403 is switched to Vref3 by the momentary operation, the AF/MF switchover unit 104 is switched according to the judgment of the AF/MF switchover judging unit 108. Thus, the AF control and the MF control are alternately repeated.

The state of the S/P switchover signal will be described. In sections A and C in which the switchover signal is Vref1, the speed control is selected as the control of the focus lens 106.

In contrast, in a section B in which the switchover signal is Vref2, the position control is selected as the control of the focus lens 106.

Next, the state of the AF control operation will be described. In the sections a and c, the AF control is in an OFF state. In contrast, in a section b, the AF control is in an ON state.

In the OFF state of the AF control, the condition of the S/P switchover signal is operative, and the MF control is executed by the MF instruction signal from the MF instruction signal generating unit 401.

Even in the ON state of the AF control, when the MF instruction signal generating unit 401 is operated, the condition of the S/P switchover signal becomes operative, and the MF control is executed by the MF instruction signal from the MF instruction signal generating unit 401.

Description will now be made to an operation in the event that the AF/MF switchover signal inputting unit 403 is operated and set such that the control of the focus lens 106 can be executed by the AF control, and the MF instruction signal generating unit 401 is not operated.

A light beam transmitted through the focus lens 106 is imaged on a pickup surface of the CCD 201, and the image is sampled and held, and input into the processing unit 202 after photoelectrically converted by the CCD 201. The processing unit 202 processes the input signal into a video format, such as the NTSC signal, and outputs it into the evaluation value generating unit 102 and the recording and reproducing unit 203. The video signal output to the evaluation value generating unit 102 undergoes a filtering process and the like in the evaluation value generating unit 102, and the sharpness evaluation value relevant to a frequency component of the video is thereby generated by a unit of a vertical synchronization period of the video signal. The thus-generated sharpness evaluation value is output into the AF drive controlling unit 103.

On the other hand, since the AF/MF switchover signal inputting unit 403 in the remote control unit 400 is set such that the focus lens 106 can be driven by the AF control, the AF/MF state display unit 404 displays the AF control, and a switchover signal Vref3 different from Vref1 and Vref2 is output. The switchover signal Vref3 is input into the switchover judging unit 108 through the remote control output terminal 405, the remote control cable 500 and the remote control input terminal 107. Since the switchover signal is Vref3, the AF/MF switchover judging unit 108 performs the switchover of the AF/MF switchover unit 104 to a side A such that the control of the focus lens 106 can be executed by the AF control. Accordingly, the motor 105 is driven by the motor control signal from the AF drive controlling unit 103, and the focus lens 106 is hence moved.

Further, description will be made to an operation in the event that the MF instruction signal generating unit 401 is operated under the above-discussed condition.

The switchover signal judging unit 108 identifies the fact that the MF instruction signal generating unit 401 is operated under the condition under which the control of the focus lens 106 is executed by the AF control, and the judging unit 108 performs the switchover of the AF/MF switchover unit 104 to a side B. At the same time, the switchover signal judging unit 108 beforehand stores the switchover signal input from the S/P switchover signal inputting unit 402 prior to the switchover of the AF/MF switchover signal inputting unit 403 to the AF control, i.e., the signal for performing the control of the focus lens 106 by the speed control where the switchover signal is Vref1 different from Vref2 and Vref3, and the signal for performing the control of the focus lens 106 by the position control where the switchover signal is Vref2 different from Vref1 and Vref3, and outputs to the MF drive controlling unit 109 the S/P switchover instruction signal in accordance with the thus-stored information.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106. On the other hand, in the event that the S/P switchover instruction signal is the signal for performing the control of the focus lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

Finally, description will be made to an operation in the event that the AF/MF switchover signal inputting unit 403 is operated and set such that the focus lens 106 can be driven by the MF control.

In response to an operation of the MF instruction signal generating unit 401 comprised of the switch, the volume switch and the like in the remote control unit 400, the MF instruction signal generating unit 401 outputs the MF instruction signal proportional to this operation, and the output signal is input into the MF drive controlling unit 109 through the remote control output terminal 405, the remote control cable 500, and the remote control input terminal 107.

On the other hand, the switchover signal for performing the switchover of the control of the focus lens 106 between the speed control and the position control is output from the S/P switchover signal inputting unit 402. The switchover signal is input into the switchover signal judging unit 108 through the AF/MF switchover signal inputting unit 403, the remote control output terminal 405, the remote control cable 500, and the remote control input terminal 107. At this moment, the AF/MF state display unit 404 displays the MF control.

In the event that the input switchover signal is Vref1 different from Vref2 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the speed control, and outputs to the MF drive controlling unit 109 the S/P switchover instruction signal for performing the control of the focus lens 106 by the speed control.

In the event that the input switchover signal is Vref2 different from Vref1 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the position control, and outputs to the MF drive controlling unit 109 the S/P switchover instruction signal for performing the control of the focus lens 106 by the position control.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106.

In contrast thereto, in the event that the S/P switchover instruction signal is the signal for performing the control of the focus lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

According to the above-discussed construction, where the AF control is installed in the remote system, the construction is capable of arrangement in the remote operating unit of the switchover unit for performing the switchover between the drives of the focus lens under the AF control and the MF control, and capable of performing the MF control at the time of the AF control, thereby achieving more advantageous use of the remote system, even in the event that there are no vacant pins at the electrical interface between the remote operating unit and the optical apparatus.

Fourth Embodiment

Figure 7:
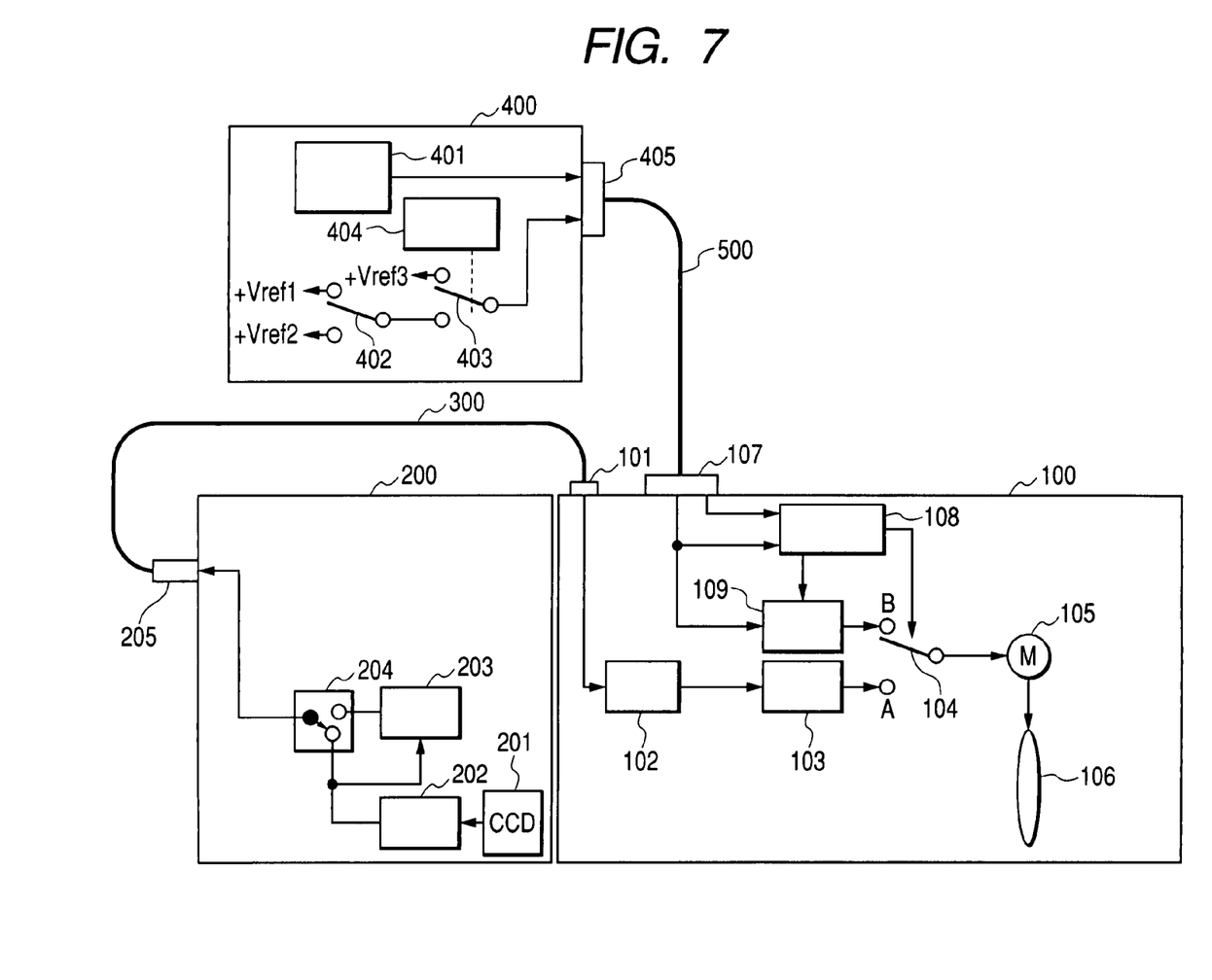
FIG. 7 is a block diagram illustrating a fourth embodiment according to the present invention.

In the third embodiment, description is made to an example of the camera including the lens unit incapable of detachable attachment to the camera unit. In contrast thereto, a fourth embodiment of the present invention is directed to an optical apparatus or an image taking apparatus which includes an interchangeable lens unit capable of detachable attachment to a camera unit. The fourth embodiment will be described hereinafter with reference to FIG. 7. FIG. 7 shows the structure of an image taking apparatus of the fourth embodiment.

In FIG. 7, reference numerals 102 to 109, 201 to 203, 400 to 406 and 500 designate the same corresponding elements as those previously discussed. Accordingly, descriptions thereof are omitted. Description of the switchover signal is also omitted since it is previously discussed.

Reference numeral 100 designates a lens unit of an interchangeable lens type, reference numeral 200 designates a camera unit, and reference numeral 300 designates a coaxial cable for video.

In the lens 100, reference numeral 101 designates a video input terminal for receiving a video signal through the video coaxial cable 300.

In the camera 200, reference numeral 204 designates an output switchover unit for selecting one of outputs of video signals from the processing unit 202 and the recording and reproducing unit 203, and outputting the selected output. Reference numeral 205 designates a video output terminal for outputting the output of the video signal from the output switchover unit 204.

In the thus-constructed structure, description will be made to an operation in the event that the AF/MF switchover signal inputting unit 403 is operated and set such that the control of the focus lens 106 can be executed by the AF control, and the MF instruction signal generating unit 401 is not operated.

A light beam transmitted through the focus lens 106 is imaged on a pickup surface of the CCD 201, and the image is sampled and held, and input into the processing unit 202 after photoelectrically converted by the CCD 201. The processing unit 202 processes the input signal into a video format, such as the NTSC signal, and outputs it into the output switchover unit 204 and the recording and reproducing unit 203. At the time of recording, the output switchover unit 204 outputs the output of the processing unit 202 to the video output terminal 205, and the recording and reproducing unit 203 records the output of the processing unit 202 in a record medium. At the time of reproduction, the recording and reproducing unit 203 reproduces a video signal recorded in the record medium, and when the video is stably reproduced, the output switchover unit 204 outputs the video signal of the recording and reproducing unit 203 to the video output terminal 205.

Into the video input terminal 101 of the lens 100, the video signal from the video output terminal 205 of the camera 200 is input through the video coaxial cable 300. The video signal input into the video input terminal 101 undergoes a filtering process and the like in the evaluation value generating unit 102, and the sharpness evaluation value relevant to a frequency component of the video is thereby generated by a unit of a vertical synchronization period of the video signal. The thus-generated sharpness evaluation value is output into the AF drive controlling unit 103.

On the other hand, since the AF/MF switchover signal inputting unit 403 in the remote control unit 400 is operated and set such that the focus lens 106 can be driven by the AF control, the AF/MF state display unit 404 displays the AF control, and a switchover signal Vref3 different from Vref1 and Vref2 is output. The switchover signal Vref3 is input into the switchover judging unit 108 through the remote control output terminal 405, the remote control cable 500 and the remote control input terminal 107. Since the switchover signal is Vref3, the AF/MF switchover judging unit 108 performs the switchover of the AF/MF switchover unit 104 to a side A such that the control of the focus lens 106 can be executed by the AF control. Accordingly, the motor 105 is driven by the motor control signal from the AF drive controlling unit 103, and the focus lens 106 is hence moved.

Further, description will be made to an operation in the event that the MF instruction signal generating unit 401 is operated under the above-discussed condition.

The switchover signal judging unit 108 identifies the fact that the MF instruction signal generating unit 401 is operated under the condition under which the control of the focus lens 106 is executed by the AF control, and the judging unit 108 performs the switchover of the AF/MF switchover unit 104 to a side B. At the same time, the switchover signal judging unit 108 beforehand stores the switchover signal input from the S/P switchover signal inputting unit 402 prior to the switchover of the AF/MF switchover signal inputting unit 403 to the AF control, i.e., the signal for performing the control of the focus lens 106 by the speed control where the switchover signal is Vref1 different from Vref2 and Vref3, and the signal for performing the control of the focus lens 106 by the position control where the switchover signal is Vref2 different from Vref1 and Vref3, and outputs to the MF drive controlling unit 109 the S/P switchover instruction signal in accordance with the thus-stored information.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106. On the other hand, in the event that the S/P switchover instruction signal is the signal for performing the control of the focus lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

Finally, description will be will be made to an operation in the event that the AF/MF switchover signal inputting unit 403 is operated and set such that the focus lens 106 can be driven by the MF control.

In response to an operation of the MF instruction signal generating unit 401 comprised of the switch, the volume switch and the like in the remote control unit 400, the MF instruction signal generating unit 401 outputs the MF instruction signal proportional to this operation, and the output signal is input into the MF drive controlling unit 109 through the remote control output terminal 405, the remote control cable 500, and the remote control input terminal 107.

On the other hand, the switchover signal for performing the switchover of the control of the focus lens 106 between the speed control and the position control is output from the S/P switchover signal inputting unit 402. The switchover signal is input into the switchover signal judging unit 108 through the AF/MF switchover signal inputting unit 403, the remote control output terminal 405, the remote control cable 500, and the remote control input terminal 107. At this moment, the AF/MF state display unit 404 displays the MF control.

In the event that the input switchover signal is Vref1 different from Vref2 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the speed control, and outputs to the MF drive controlling unit 109 the S/P switchover instruction signal for performing the control of the focus lens 106 by the speed control.

In the event that the input switchover signal is Vref2 different from Vref1 and Vref3, the switchover judging unit 108 performs the switchover of the AF/MF switchover unit 104 to the side B such that the control of the focus lens 106 can be executed by the MF control. Further, the switchover judging unit 108 judges that the control of the focus lens 106 should be performed by the position control, and outputs to the MF drive controlling unit 109 the S/P switchover instruction signal for performing the control of the focus lens 106 by the position control.

In the event that the S/P switchover instruction signal is the signal for performing the control of the focus lens 106 by the speed control, the MF drive controlling unit 109 treats the MF instruction signal as the speed control instruction signal, and generates the motor control signal for driving the motor 105 at a speed instructed by the MF instruction signal. Thus, the motor 105 is accordingly driven to move the focus lens 106. In contrast thereto, in the event that the S/P switchover instruction signal is the signal for performing the control of the focus lens 106 by the position control, the MF drive controlling unit 109 treats the MF instruction signal as the position control instruction signal, and generates the motor control signal for driving the motor 105 to a position instructed by the MF instruction signal. Thus, the motor 105 is accordingly driven to move the focus lens 106.

According to the above-discussed construction, where the AF control is installed in the remote system, the construction is capable of arrangement in the remote operating unit of the switchover unit for performing the switchover between the drives of the focus lens under the AF control and the MF control, and capable of performing the MF control at the time of the AF control, thereby achieving more advantageous use of the remote system, even in the event that there are no vacant pins at the electrical interface between the remote operating unit and the optical apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image taking apparatus comprising:
   an optical apparatus provided with a focus detection and focusing control unit for controlling a focus lens by an automatic focus detection and focusing control;
   a remote operation apparatus provided with a first switchover signal inputting unit for performing a switchover between a control of the focus lens by the automatic focus detection and focusing control and a control of the focus lens by a manual focus control, and a second switchover signal inputting unit for performing a switchover between manual operations of the focus lens by a speed control and a position control; and
   a switchover signal superposing unit for superposing an output from the first switchover signal inputting unit and an output from the second switchover signal inputting unit.

2. An image taking apparatus according to claim 1, wherein the first switchover signal inputting unit performs the switchover between the control of the focus lens by the automatic focus detection and focusing control and the control of the focus lens by the manual focus control in a manner of a momentary operation.

3. An image taking apparatus according to claim 1, further comprising a first switchover judging unit for performing a switchover between a drive of the focus lens by a control signal from a focus detection and focusing control unit and a drive of the focus lens by a control signal from a manual focus control unit in the remote operation apparatus.

4. An image taking apparatus according to claim 3, wherein in the event that the focus lens is under the control of the automatic focus detection and focusing control, the focus lens is driven by the manual focus control from the manual focus control unit when the manual focus control unit judges if the manual focus control is performed or not, and judges that the manual focus control is performed.

5. An image taking apparatus according to claim 4, wherein in the event that the focus lens is under the control of the automatic focus detection and focusing control, the focus lens is driven by the manual focus control from the manual focus control unit and by a control mode prior to setting to the automatic focus detection and focusing control, when the manual focus control unit judges if the manual focus control is performed or not, and judges that the manual focus control is performed.

6. An image taking apparatus according to claim 1, further comprising a state display unit for displaying a set state of the first switchover signal inputting unit or a set state of the second switchover signal inputting unit.

7. An image taking apparatus according to claim 1, wherein the automatic focus detection and focusing control unit generates a motor control signal such that a sharpness evaluation value generated by an evaluation value generating unit for generating a sharpness evaluation value showing a sharpness of a video from a video signal input into a video inputting unit can be maximized.

8. An image taking apparatus according to claim 6, wherein the automatic focus detection and focusing control unit generates a motor control signal such that a sharpness evaluation value generated by an evaluation value generating unit for generating a sharpness evaluation value showing a sharpness of a video from a video signal input into a video inputting unit can be maximized.

9. An image taking apparatus according to claim 1, wherein the optical apparatus is a lens apparatus detachably attachable to a camera body.

10. An image taking apparatus according to claim 6, wherein the optical apparatus is a lens apparatus detachably attachable to a camera body.

11. An image taking apparatus according to claim 7, wherein the optical apparatus is a lens apparatus detachably attachable to a camera body.

* * * * *